(12) United States Patent
Karia et al.

(10) Patent No.: US 12,399,941 B2
(45) Date of Patent: Aug. 26, 2025

(54) CONDITION RESOLUTION SYSTEM

(71) Applicant: INTERNATIONAL BUSINESS MACHINES CORPORATION, Armonk, NY (US)

(72) Inventors: Jignesh K. Karia, Thane (IN); Vishal Awal, Mumbai (IN); Jitan S. Chandanani, Mumbai (IN); Pankaj Verma, Gurgaon (IN); Pankaj Satyanarayan Dayama, Bangalore (IN); Mukundan Sundararajan, Bangalore (IN); Neha Shah, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 374 days.

(21) Appl. No.: 17/238,317

(22) Filed: Apr. 23, 2021

(65) Prior Publication Data
US 2022/0342931 A1    Oct. 27, 2022

(51) Int. Cl.
*G06F 16/901* (2019.01)
*G06F 16/9032* (2019.01)
(Continued)

(52) U.S. Cl.
CPC .......... *G06F 16/906* (2019.01); *G06F 16/901* (2019.01); *G06F 16/90324* (2019.01); *G06F 40/30* (2020.01)

(58) Field of Classification Search
CPC ................ G06F 16/906; G06F 16/901; G06F 16/90324; G06F 40/30
See application file for complete search history.

(56) References Cited

U.S. PATENT DOCUMENTS 8,458,192 B1 * 6/2013 Procopio ............... G06F 16/337
  707/748
9,535,902 B1 * 1/2017 Michalak ............ G06F 16/3331
(Continued)

OTHER PUBLICATIONS

Mel et al., "The NIST Definition of Cloud Computing," National Institute of Standards and Technology, Information Technology Laboratory, Special Publication 800-145, Sep. 2011 (pp. 1-7).
(Continued)

*Primary Examiner* — Pierre Vital
*Assistant Examiner* — Zuheir A Mheir
(74) *Attorney, Agent, or Firm* — Michael A. Petrocelli, Esq.; Kevin P. Radigan, Esq.; Heslin Rothenberg Farley & Mesiti P.C.

(57) ABSTRACT

A condition resolution system is provided for facilitating resolution of a condition for an entity. The system obtains an indication of a condition to be resolved for the entity, groups the entity with one or more other entities into a group of entities, and ascertains one or more options for resolving the condition using the condition to be resolved and option-related data associated with entities of the group of entities. The condition resolution system further evaluates the one or more options to select an option to resolve the condition for the entity, and determines a risk score for the selected option for resolving the condition. The risk score is based on one or more risk factors, and based on the risk score being acceptable, the system initiates an action based on the selected option to resolve the condition for the entity.

18 Claims, 8 Drawing Sheets

(51) Int. Cl.
*G06F 16/906* (2019.01)
*G06F 40/30* (2020.01)

(56) References Cited

U.S. PATENT DOCUMENTS

| | | | |
|---|---|---|---|
| 10,003,667 B2 | 6/2018 | Mathew et al. | |
| 10,185,741 B2* | 1/2019 | Shyamsunder | G06F 16/951 |
| 10,430,517 B1* | 10/2019 | Mulwad | G06F 11/0793 |
| 10,920,356 B2 | 2/2021 | Hatfield et al. | |
| 2010/0229187 A1* | 9/2010 | Marwah | G06F 11/3079 |
| | | | 719/318 |
| 2010/0268642 A1* | 10/2010 | Zhu | G06Q 30/0279 |
| | | | 705/329 |
| 2011/0295722 A1* | 12/2011 | Reisman | G06Q 30/0641 |
| | | | 705/26.1 |
| 2013/0152197 A1* | 6/2013 | Wang | H04L 63/1416 |
| | | | 726/22 |
| 2013/0227429 A1* | 8/2013 | Sivadas | G06Q 30/00 |
| | | | 715/751 |
| 2013/0347053 A1* | 12/2013 | Motoyama | H04L 63/08 |
| | | | 726/1 |
| 2014/0136667 A1* | 5/2014 | Gonsalves | G06F 11/3698 |
| | | | 709/224 |
| 2015/0302309 A1* | 10/2015 | Bartek | H04L 67/10 |
| | | | 706/11 |
| 2016/0343100 A1* | 11/2016 | Davenport | G06Q 50/265 |
| 2017/0076296 A1* | 3/2017 | Hirpara | G06Q 50/04 |
| 2018/0033009 A1* | 2/2018 | Goldman | G06Q 40/10 |
| 2018/0082024 A1 | 3/2018 | Curbera et al. | |
| 2019/0166752 A1* | 6/2019 | Sidoti | G05D 1/0094 |
| 2019/0213602 A1* | 7/2019 | Hue | G06Q 30/016 |
| 2019/0278777 A1* | 9/2019 | Malik | G06F 40/30 |
| 2019/0348158 A1 | 11/2019 | Livesay et al. | |
| 2020/0004986 A1 | 1/2020 | Brannon et al. | |
| 2020/0005117 A1* | 1/2020 | Yuan | G06F 40/35 |
| 2020/0065151 A1* | 2/2020 | Ghosh | G06F 40/295 |
| 2020/0089848 A1* | 3/2020 | Abdelaziz | H04L 63/308 |
| 2020/0238952 A1* | 7/2020 | Lindsay | G06V 30/194 |
| 2020/0242608 A1* | 7/2020 | Shannon | G06F 21/30 |
| 2020/0382554 A1 | 12/2020 | McCarty et al. | |
| 2020/0409936 A1* | 12/2020 | Salkola | G10L 15/1822 |
| 2021/0097541 A1* | 4/2021 | Nanduri | G06Q 20/405 |
| 2022/0035840 A1* | 2/2022 | Nakayama | G08G 1/01 |
| 2022/0070296 A1* | 3/2022 | Friio | H04M 3/5191 |
| 2022/0335348 A1* | 10/2022 | Miller | G06N 3/088 |
| 2023/0007439 A1* | 1/2023 | Williams | G06Q 10/0635 |

OTHER PUBLICATIONS

Gilbert, Eric, "Predicting Tie Strength in a New Medium", CSCW '12, Feb. 11-15, 2012 (Year: 2012) (10 pages).

Kaye et al., "Dynamic Consent: A Patient Interface for Twenty-First Centry Research Networks", European Journal of Human Genetics, vol. 23 (Year: 2015) (pp. 141-146).

Grover, Prince, "Various Implementations of Collaborative Filtering", Towards Data Science, published online Dec. 28, 2017, at: https://towardsdatascience.com/various-implementations-of-collaborative-filtering-100385c6dfe0 (16 pages).

Google Developers, "Collaborative Filtering", downloaded Mar. 31, 2021, at: https://developers.google.com/machine-learning/recommendation/collaborative filtering (6 pages).

* cited by examiner

CONDITION RESOLUTION SYSTEM

BACKGROUND

In many computing system applications, an entity, such as an individual, organization, company, system, etc., can select or specify one or more options for one or more of a variety of conditions or situations, with the selected option(s) being associated with the entity for future reference in resolving the condition(s). However, there are many real-world conditions or situations where an entity is unable to prespecify, or unavailable to currently select, a desired option for resolving the condition. For instance, it may be that no option has been preselected and saved to the computing system for the entity appropriate for resolving a particular condition and the entity is currently unable or unavailable to select an option for resolving the condition.

SUMMARY

The shortcomings of the prior art are overcome and additional advantages are provided through the provision, in one or more aspects, of a computer-implemented method of facilitating resolving conditions. The computer-implemented method includes obtaining, by a condition resolution system, an indication of a condition to be resolved for an entity, grouping, by the condition resolution system, the entity with one or more other entities into a group of entities, and ascertaining, by the condition resolution system, one or more options for resolving the condition, the ascertaining using the condition to be resolved and option-related data associated with entities of the group of entities. Further, the computer-implemented method includes evaluating, by the condition resolution system, the one or more options to select an option for resolving the condition for the entity, and determining, by the condition resolution system, a risk score for the selected option for resolving the condition for the entity, the risk score being based on one or more risk factors. Based on the risk score being acceptable, the method includes initiating an action based on the selected option to resolve the condition for the entity.

Systems and computer program products relating to one or more aspects are also described and claimed herein. Further, services relating to one or more aspects are also described and can be claimed herein.

Additional features and advantages are realized through the techniques described herein. Other embodiments and aspects of the invention are described in detail herein and are considered a part of the claimed aspects.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
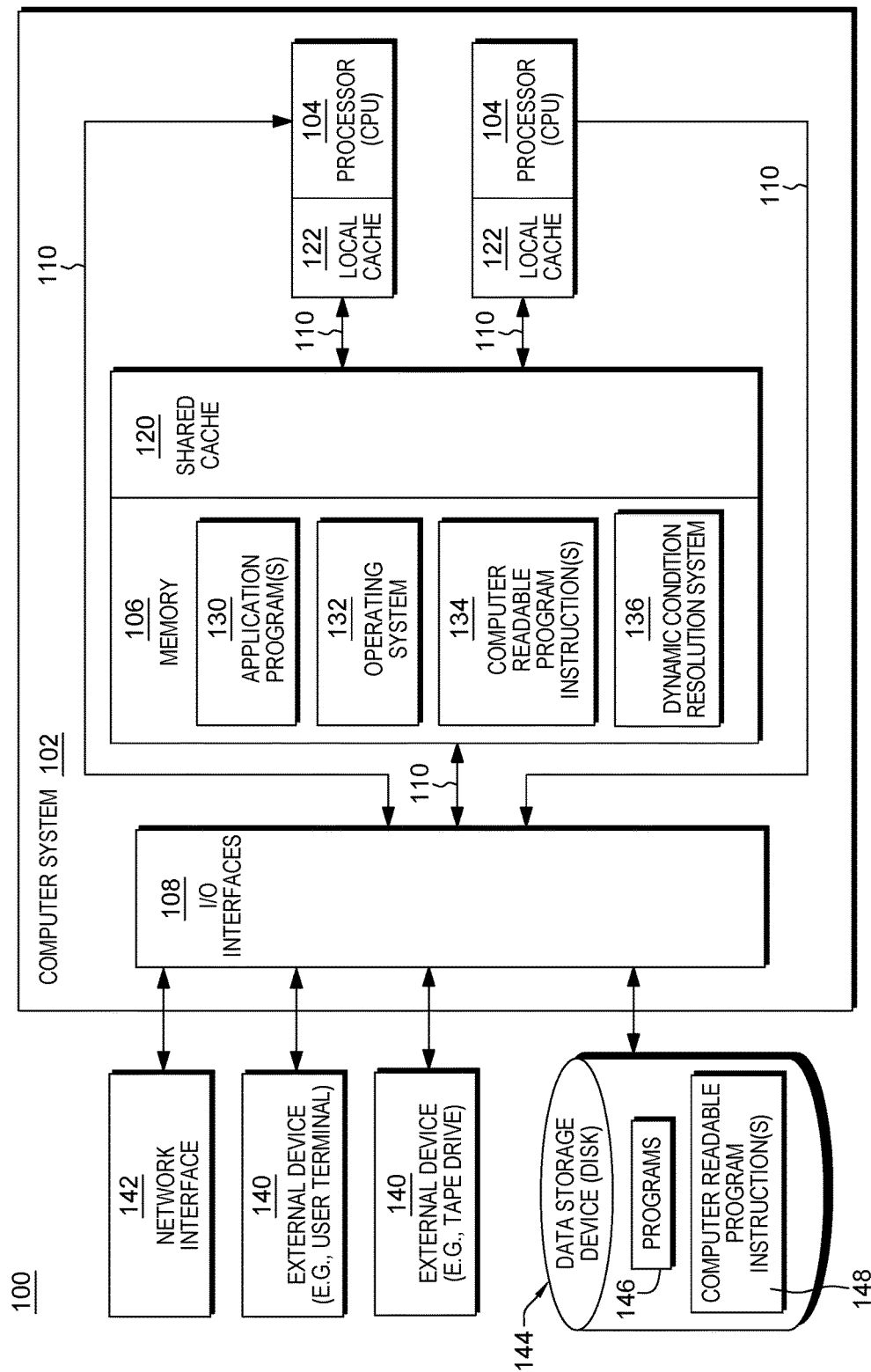
FIG. 1 depicts one embodiment of a data processing system to implement processing, in accordance with one or more aspects of the present invention.

The accompanying figures, in which like reference numerals refer to identical or functionally similar elements throughout the separate views, and which are incorporated in and form a part of the specification, further illustrate the present invention and, together with the detailed description of the invention, serve to explain aspects of the present invention. Note in this regard that descriptions of well-known systems, devices, processing techniques, etc., are omitted so as to not unnecessarily obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular embodiment of the concepts disclosed herein.

Note also that illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

As understood by one skilled in the art, program code, as referred to in this application, can include both software and hardware. For example, program code in certain embodiments of the present invention can include fixed function hardware, while other embodiments can utilize a software-based implementation of the functionality described. Certain embodiments combine both types of program code. One example of program code, also referred to as one or more programs, is depicted in FIG. 1 as computer-readable program instructions 134, as well as application programs 130 and a dynamic condition resolution system or module 136, one or more of which can be stored in memory 106 of computer system 102. Further examples include programs 146 and computer-readable program instruction(s) 148 in data storage device 144 of FIG. 1.

With reference to the figures, and in particular with reference to FIG. 1, an example diagram is shown of a data processing environment in which one or more aspects of illustrative embodiments can be implemented. FIG. 1 is only an example and is not intended to assert or imply any limitation with regard to the environments in which different embodiments can be implemented. A particular implementation can have many modifications to the depicted environment based on the following description.

With reference to FIG. 1, as noted this figure depicts a block diagram of a data processing system in which one or more aspects of the present invention can be implemented. Data processing system 100 is an example of a computer, such as server, or other type of device, in which computer usable program code or instructions implementing one or more processes can be located for the illustrative embodiments.

As shown in FIG. 1, data processing system 100 includes, for instance, a computer system 102 shown, e.g., in the form of a general-purpose computing device. Computer system 102 can include, but is not limited to, one or more processors or processing units 104 (e.g., central processing units (CPUs)), a memory 106 (referred to as main memory or storage, as examples), and one or more input/output (I/O) interfaces 108, coupled to one another via one or more buses and/or other connections 110.

Processor 104 includes a plurality of functional components used to execute instructions. These functional components include, for instance, an instruction fetch component to fetch instructions to be executed; an instruction decode unit to decode the fetched instructions and to obtain operands of the decoded instructions; instruction execution components to execute the decoded instructions; a memory access component to access memory for instruction execution, if necessary; and a write back component to provide the results of the executed instructions.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 can include, for instance, a cache 120, such as a shared cache, which may be coupled to local caches 122 of processors 104. Further, memory 106 can include one or more programs or applications 130, an operating system 132, and one or more computer readable program instructions 134, as well as one or more dynamic condition resolution systems or modules 136 to, for instance, facilitate initiating an action to resolve a condition for an entity, such as disclosed herein. Additionally, or alternatively, computer readable program instructions 134 can be configured to carry out one or more other functions of certain embodiments of the invention.

Computer system 102 can also communicate via, e.g., I/O interfaces 108 with one or more external devices 140, one or more network interfaces 142, and/or one or more data storage devices 144. Example external devices include a user terminal, a tape drive, a pointing device, a display, etc. Network interface 142 enables computer system 102 to communicate with one or more networks, such as a local area network (LAN), a general wide area network (WAN), and/or a public network (e.g., the Internet), providing communication with other computing devices or systems.

Data storage device 144 can store one or more programs 146, one or more computer readable program instructions 148, and/or data, etc. The computer readable program instructions can be configured to carry out functions of one or more aspects of the present invention.

Computer system 102 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode, device drivers, redundant processing units, external disk drive arrays, RAID systems, tape drives, and data archival storage systems, etc.

Computer system 102 can be operational with numerous other general purpose or special purpose computing system environments or configurations. Examples of well-known computing systems, environments, and/or configurations suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and cloud computing environments that include any of the above systems or devices, and the like.

As noted, the depicted example of FIG. 1 is not meant to imply architectural limitations. Further, as noted, data processing system 100 of FIG. 1 could be, for instance, a server, workstation, tablet computer, laptop computer, or other computing device.

Figure 2:
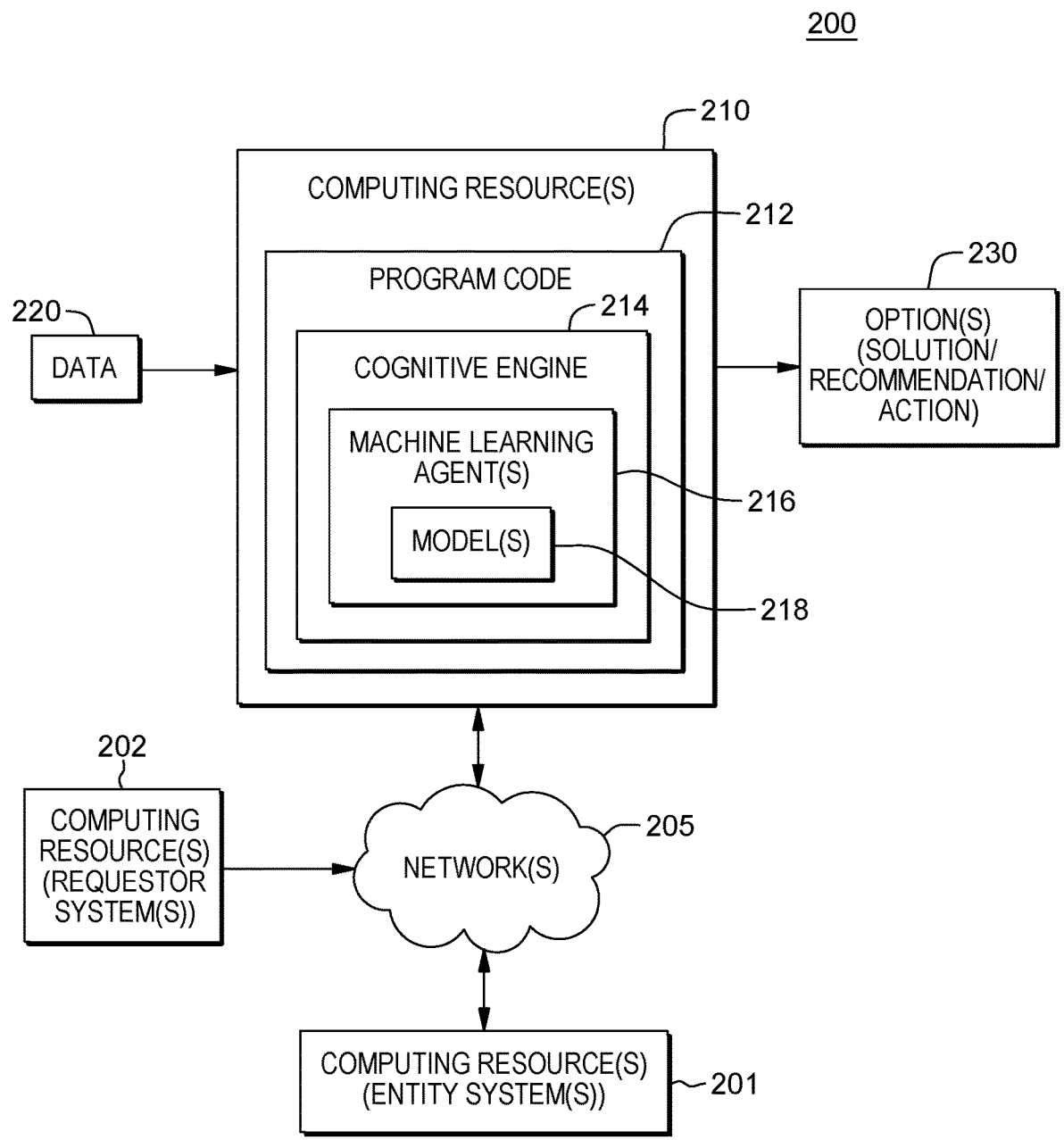
FIG. 2 depicts one embodiment of a computing environment in which various aspects of an embodiment of the present invention can be implemented, in accordance with one or more aspects of the present invention.

FIG. 2 depicts one embodiment of a system 200, illustrating certain aspects of an embodiment of the present invention. System 200 includes one or more computing resources 210 that execute program code 212 that implements a cognitive engine 214, which includes one or more machine-learning agents 216, and one or more machine-learning models 218. Data 220, such as one or more datasets, are used by cognitive engine 214, to train model(s) 218, to generate one or more options (e.g., solutions, recommendations, actions) 230, etc., based on the particular application of the machine-learning model. In implementation, system 200 can include, or utilize, one or more networks 205 for interfacing various aspects of computing resource(s) 210 with computing resources of one or more entity systems 201 and one or more requestor systems 202 (in one embodiment), as well as one or more data sources providing data 220, and one or more systems receiving the output option (e.g., solution, recommendation, action) 230 of machine-learning model(s) 218, such as requestor system(s) 202 or another system to facilitate implementation of the selected option. By way of example, network 205 can be, for instance, a telecommunications network, a local-area network (LAN), a wide-area network (WAN), such as the Internet, or a combination thereof, and can include wired, wireless, fiber-optic connections, etc. The network(s) can include one or more wired and/or wireless networks that are capable of receiving and transmitting data, including training data for the machine-learning models, and an output option (solution, recommendation, action) of the machine-learning model, such as discussed herein.

In one or more implementations, computing resource(s) 210 houses and/or executes program code 212 configured to perform methods in accordance with one or more aspects of the present invention. By way of example, computing resource(s) 210 can be a server or other computing-system-implemented resource(s). Further, for illustrative purposes only, computing resource(s) 210 in FIG. 2 is depicted as being a single computing resource. This is a non-limiting example of an implementation. In one or more other implementations, computing resource(s) 210, by which one or more aspects of processing such as discussed herein are implemented, can, at least in part, be implemented in multiple separate computing resources or systems, such as one or more computing resources of a cloud-hosting environment, by way of example.

Briefly described, in one embodiment, computing resource(s) 210 can include one or more processors, for instance, central processing units (CPUs). Also, the processor(s) can include functional components used in the integration of program code, such as functional components to fetch program code from locations in such as cache or main memory, decode program code, and execute program code, access memory for instruction execution, and write results of the executed instructions or code. The processor(s) can also include a register(s) to be used by one or more of the functional components. In one or more embodiments, the computing resource(s) can include memory, input/output, a network interface, and storage, which can include and/or access, one or more other computing resources and/or databases, as required to implement the machine-learning processing described herein. The components of the respective computing resource(s) can be coupled to each other via one or more buses and/or other connections. Bus connections can be one or more of any of several types of bus structures, including a memory bus or a memory controller, a peripheral bus, an accelerated graphics port, and a processor or local bus, using any of a variety of architectures. By way of example, but not limitation, such architectures can include the Industry Standard Architecture (ISA), the micro-channel architecture (MCA), the enhanced ISA (EISA), the Video Electronic Standard Association (VESA), local bus, and peripheral component interconnect (PCI). Examples of a computing resource(s) or a computer system(s) which can implement one or more aspects disclosed herein are described herein with reference to FIGS. 1 & 7-8.

As noted, program code 212 executes, in one implementation, a cognitive engine 214 which includes one or more machine-learning agents 216 that facilitate training one or more machine-learning models 218. The machine-learning models are trained using training data that can include a variety of types of data, depending on the model and the data sources. In one or more embodiments, program code 212 executing on one or more computing resources 210 applies machine-learning algorithms of machine-learning agent 216 to generate and train the model(s) 218, which the program code then utilize to identify or select an option (e.g., provide a solution, make a recommendation, perform an action, etc.).

Figure 3:
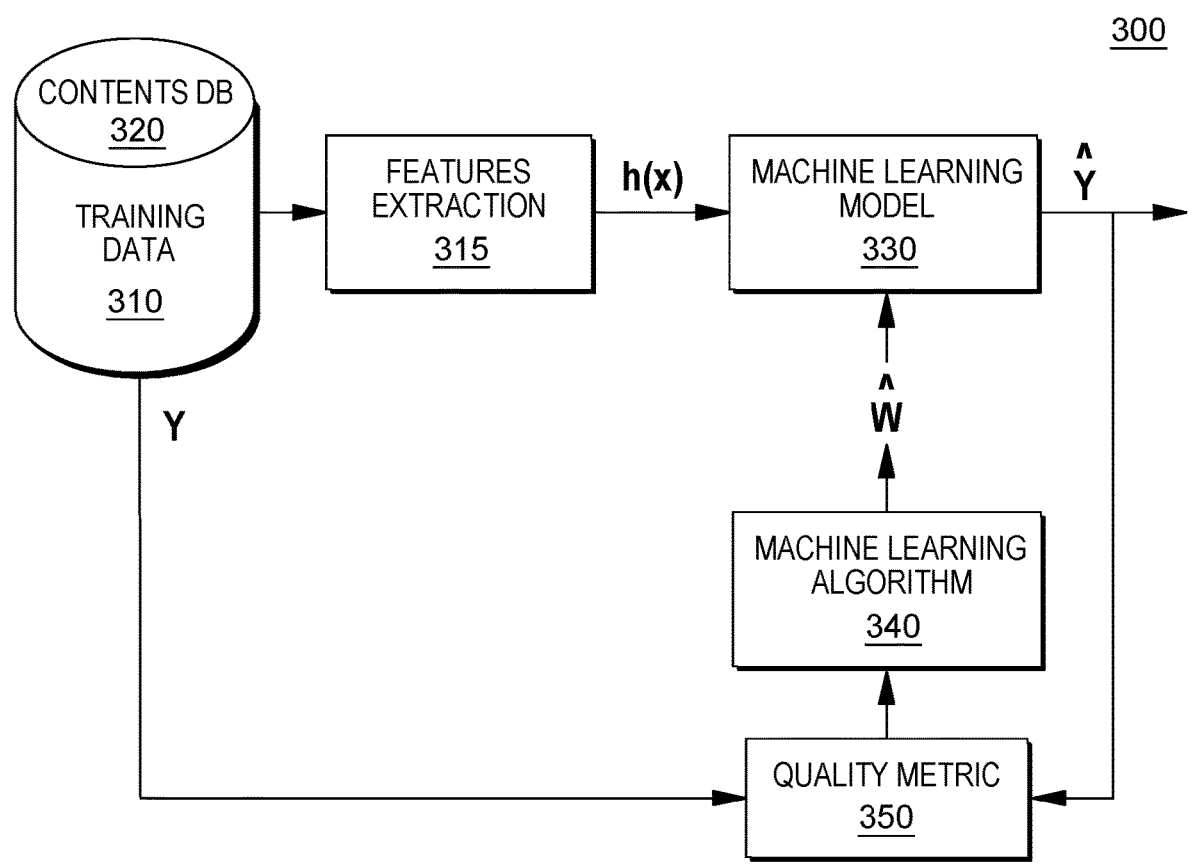
FIG. 3 is a workflow that illustrates certain aspects of some embodiments of the present invention.

FIG. 3 is an example machine-learning training system 300 that can be utilized to perform machine-learning, such as described herein. Training data 310 used to train the model (in embodiments of the present invention) can include a variety of types of data, such as data generated by, retrieved from, provided by, etc., one or more devices or computer systems in communication with the computing resource(s) 210. Program code, in embodiments of the present invention, can perform machine-learning analysis to generate data structures, including algorithms utilized by the program code to perform a machine-learning skill, function, action, etc. As known, machine-learning (ML) solves problems that cannot be solved by numerical means alone. In this ML-based example, program code extract features/attributes from training data 310, which can be stored in memory or one or more databases 320. The extracted features 315 are utilized to develop a predictor function, h(x), also referred to as a hypothesis, which the program code utilizes as a machine-learning model 330. In identifying machine-learning model 330, various techniques can be used to select features (elements, patterns, attributes, etc.), including but not limited to, diffusion mapping, principle component analysis, recursive feature elimination (a brute force approach to selecting features), and/or a random forest, to select the attributes related to the particular model. Program code can utilize a machine-learning algorithm 340 to train machine-learning model 330 (e.g., the algorithms utilized by program code), including providing weights for conclusions, so that the program code can train any predictor or performance functions included in the machine-learning model 340. The conclusions can be evaluated by a quality metric 350.

By selecting a diverse set of training data 310, the program code trains the machine-learning model 340 to identify and weight various attributes (e.g., features, patterns) that correlate to enhanced performance of the machine-learned model.

Some embodiments of the present invention can utilize IBM Watson® as learning agent. IBM Watson® is a registered trademark of International Business Machines Corporation, Armonk, N.Y., USA. In embodiments of the present invention, the respective program code can interface with IBM Watson® application program interfaces (APIs) to perform machine-learning analysis of obtained data. In some embodiments of the present invention, the respective program code can interface with the application programming interfaces (APIs) that are part of a known machine-learning agent, such as the IBM Watson® application programming interface (API), a product of International Business Machines Corporation, to determine impacts of data on the machine-learning model, and to update the model, accordingly.

In some embodiments of the present invention, certain of the APIs of the IBM Watson® API include a machine-learning agent (e.g., learning agent) that includes one or more programs, including, but not limited to, natural language classifiers, Retrieve-and-Rank (i.e., a service available through the IBM Watson® developer cloud that can surface the most relevant information from a collection of documents), concepts/visualization insights, tradeoff analytics, document conversion, natural language processing, and/or relationship extraction. In an embodiment of the present invention, one or more programs can be provided to analyze data obtained by the program code across various sources utilizing one or more of, for instance, a natural language classifier, Retrieve-and-Rank APIs, and tradeoff analytics APIs.

In some embodiments of the present invention, the program code utilizes a neural network to analyze training data and/or collected data to generate an operational model or machine-learning model. Neural networks are a programming paradigm which enable a computer to learn from observational data. This learning is referred to as deep learning, which is a set of techniques for learning in neural networks. Neural networks, including modular neural networks, are capable of pattern (e.g., state) recognition with speed, accuracy, and efficiency, in situations where datasets are mutual and expansive, including across a distributed network, including but not limited to, cloud computing systems. Modern neural networks are non-linear statistical data modeling tools. They are usually used to model complex relationships between inputs and outputs, or to identify patterns (e.g., states) in data (i.e., neural networks are non-linear statistical data modeling or decision-making tools). In general, program code utilizing neural networks can model complex relationships between inputs and outputs and identified patterns in data. Because of the speed and efficiency of neural networks, especially when parsing multiple complex datasets, neural networks and deep learning provide solutions to many problems in multi-source processing, which program code, in embodiments of the present invention, can utilize in implementing a machine-learning model, such as described herein.

To summarize, embodiments of the present invention include a computer-implemented method, system and computer program code for facilitating resolving conditions, where program code executing on one or more processors obtains, for the condition resolution system, an indication of a condition to be resolved for an entity, and groups the entity with one or more other entities into a group of entities. Further, program code executing on one or more processors ascertains one or more options for resolving the condition, where the ascertaining uses the condition to be resolved and option-related data associated with entities of the group of entities in ascertaining the one or more options for resolving the condition. In addition, embodiments of the present invention include program code executing on one or more processors that evaluates the one or more options to select an option for resolving the condition for the entity, and determine a risk score for the selected option for resolving the condition for the entity, where the risk score is based on one or more risk factors. Based on the risk score being acceptable, program code initiates an action based on the selected option to resolve the condition for the entity.

In one or more embodiments, the invention includes program code which collects attribute data related, at least in part, to the entity, to facilitate resolution of the condition, and where the program code further registers the entity to the condition resolution system, and the entity can revoke permission to the condition resolution system at any time.

In one or more embodiments, program code executing on one or more processors further obtains attribute data for the entity, and creates an entity data object using the attribute data for the entity. The grouping includes using the entity data object in grouping the entity with one or more other entities into the group of entities.

In one or more implementations, program code executing on one or more processors obtains attribute data for the entity, the attribute data for the entity including profile data of the entity and preference data of the entity, and the grouping includes using, at least in part, the attribute data for the entity in grouping the entity with the one or more other entities in the group of entities.

In one or more embodiments, grouping the entity with the one or more other entities includes generating a topic model to identify one or more topics of interest to the entity, and using the one or more topics of interest to the entity in grouping the entity with the one or more other entities. In one embodiment, the one or more topics include ratings data provided by the entity for one or more items, and wherein grouping the entity with the one or more entities includes using the rating the data in grouping the entity with the one or more other entities in the group of entities.

In one or more embodiments of the present invention, the grouping is based on a standard clustering metric, and the evaluating further includes applying memory-based collaborative filtering to select the option of the one or more options for resolving the condition for the entity.

In one or more embodiments, program code executing on one or more processors groups via machine learning the entity with the one or more other entities in to the group of entities, and evaluates via machine learning the one or more options to select an optimum option for resolving the condition.

In one or more embodiments, based on the risk score being lower than a threshold score, the program code proceeds with initiating the action based on the selected option to resolve the condition for the entity. In one embodiment, the threshold score is preselected to minimize risk of negative impact on the entity of the selected option in resolving the condition.

Embodiments of the present invention are inextricably tied to computing and provide significantly more than existing approaches to resolving a condition for an entity. For instance, embodiments of the present invention provide program code executing on one or more processors to exploit the interconnectivity of various systems, as well as to utilize various computing-centric data analysis and handling techniques, in order to identify and select an option for resolving a condition for an entity, as well as evaluate a risk score associated therewith, and initiate an action based on the selected option to resolve the condition for the entity. Both the interconnectivity of the computing systems and resources utilized, and the computer-exclusive data processing techniques utilized by the program code, enable various aspects of the present invention. Further, embodiments of the present invention provide significantly more functionality than existing approaches to facilitating resolving a condition for an entity.

In embodiments of the present invention, program code executing on one or more processors provides significantly more functionality, including but not limited to: 1) program code that obtains an indication of a condition to be resolved for an entity; 2) program code that groups the entity with one or more entities into a group of entities; 3) program code that ascertains one or more options for resolving the condition, the ascertaining using the condition to be resolved and option-related data associated with entities of the group of entities in ascertaining the one or more options for resolving the condition; 4) program code that evaluates the one or more options to select an option for resolving the condition for the entity; 5) program code that determines a risk score for the selected option for resolving the condition for the entity, where the risk score is based on one or more risk factors; and 6) program code that, based on the score being acceptable, initiates an action based on the selected option to resolve the condition for the entity.

Figure 4:
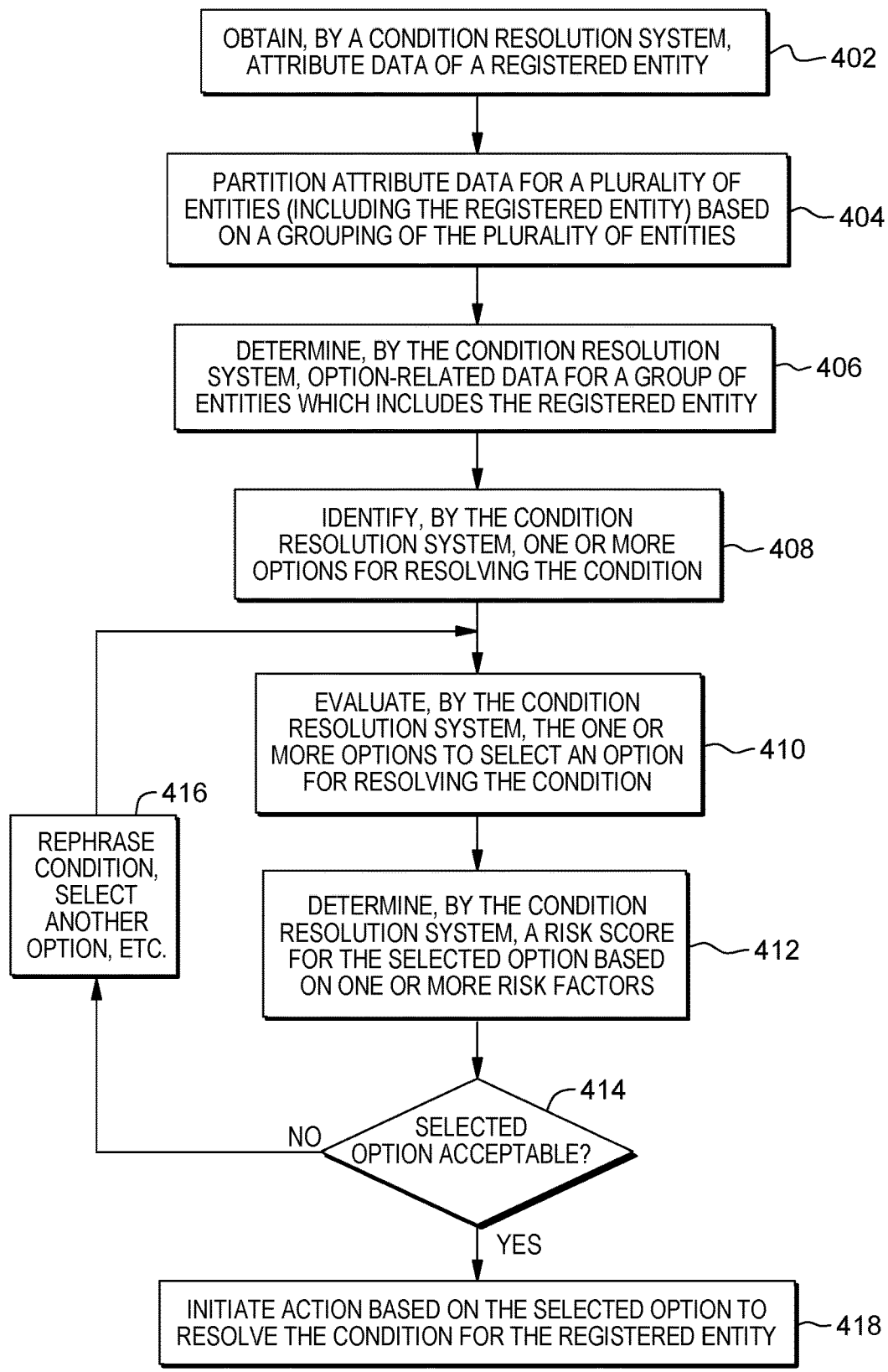
FIG. 4 depicts one embodiment of processing implemented by a condition resolution system, in accordance with one or more aspects of the present invention.

FIG. 4 depicts one embodiment of a process or workflow 400 implemented by program code of a condition resolution system, in accordance with one or more aspects of the present invention. In the embodiment of FIG. 4, process 400 includes obtaining, by the condition resolution system, attribute data of, or related to, a registered entity 402. In one or more implementations, the entity for which the condition is to be resolved registers with the condition resolution system to, for instance, allow the condition resolution system to collect attribute data related, at least in part, to the entity, and the entity can revoke permission to the condition resolution system at any time. Note further that to the extent implementations of the present invention collect, store or employ confidential or personal information provided by, or obtained from, individuals, organizations, systems or other entities, such information is used in accordance with all applicable laws concerning protection of personal or confidential information. Additionally, the collection, storage and use of such information is, in one embodiment, subject to consent of the entity, or the entities, to such activity, for instance, through "opt-in" or "opt-out" processes, such as registration processes, as may be appropriate for the situation and type of information. Storage and use of personal information can be in any appropriate secure manner reflective of the type of information, for instance, through various encryption and anonymization techniques for particularly sensitive information.

In one implementation, the attribute data related to the registered entity can include entity-specific data, such as data related to one or more entity profile features and/or entity preferences. In one embodiment, the entity profile features relate to one or more characteristics of the entity. For instance, where the entity is an individual, the educational experience and work experience of the entity can be obtained, along with one or more other attributes of the entity. Further, the attribute data can include data relating to one or more entity preferences, such as preferences of the entity that are available through various databases and online sources. For instance, where the entity is an individual, the individual's online presence can be evaluated to obtain attribute data related to the entity's preference features. Additionally, artificial intelligence models can be used to infer one or more entity-reference features for the entity. For example, the condition resolution system can, in one implementation, evaluate the entity's online communications or postings and build a topic model, such as a Latent Dirichlet model, to identify a set of topics of interest to the entity. Further, online purchase history of the registered entity can be evaluated to identify categories of items (such as products or services) obtained by the entity, based on an item knowledge graph. Further, any ratings provided by the entity for different items (e.g., different products or services) can be evaluated to obtain entity preference features.

In one implementation, the attribute data is converted to numeric values in an entity data object. This can be accomplished, in one implementation, using one hot encoding to obtain the entity data object. For instance, entity object X=[1, 0, 0, 1, 0, 5, 4, 10, 100, 50 . . . ] can be obtained, where the first three values (i.e., 1, 0, 0) correspond to the entity's age group, and the entity is an individual. In one example, there might be three age groups, that is, an entity age less than 21 years, 21-60 years, and greater than 60 years, with 1, 0, 0 meaning (in one example) that the entity is less than 21 years old.

Process 400 further includes partitioning attribute data for a plurality of entities (including the registered entity) based on a grouping or clustering of entities of the plurality of entities 404, one or more examples of which are described herein.

By way of example, the entities can be clustered to partition the attribute data via machine learning. In one embodiment, the Minowski Distance (or Pearson Correlation) could be used to group entities of the plurality of entities, and thereby petition the associated attribute data. As known, the Minowski Distance can be determined as:

$$d(x,y)=(\Sigma_i^n(|x_i-y_i|)^q)^{(1/q)}.$$

where:
x=first variable;
y=second variable;
q=1 provides the Manhattan Distance; and
q=2 provides the Euclidean Distance.

Rather than the Minowski distance, a Pearson Correlation can be determined by the condition resolution system based on similarity where, for instance, ratings provided by different entities for different items or services, and captured as part of the attribute data obtained for the entities, are obtained and then used to determine similarities between entities to facilitate grouping the entities. In one embodiment, a similarity metric or distance can be used to cluster similar entities using, for instance, any standard clustering algorithm (such as K-means clustering). The condition resolution system evaluates the attribute data of the group for a given condition and determines therefrom option-related data for the condition 406.

A modified version of memory-based collaborative filtering artificial intelligence algorithm can be used (such as an entity-based, top-N recommendation algorithm) to identify options for resolution of the condition for the entity 408. For instance, one or more options can be ascertained from a database containing data on prior conditions and options, such as conditions addressed and options used by other entities of the group of entities. Note again that resolution of the condition assumes that the condition resolution system is facilitating addressing the condition for the registered entity where, for instance, the registered entity has not preselected a currently available option for addressing the condition and, in one embodiment, where the registered entity is currently unable or unavailable to select an option in a timely manner to address the condition.

By way of example, assume that a product is to be delivered for the entity, and the condition resolution system is to infer an entity preference from different options, such as Do Not Deliver, Third Party Delivery using Delivery Service 1, Third Party Delivery using Delivery Service 2, etc. Assume that entity clusters have been completed for the overall entity database held or accessible by the business, organization, group of businesses or organizations, etc., to resolve the condition, and that the process uses a subset of the entities in the database as belonging to the same group as the registered entity, and their historical preference feature data, if available for different options, is accessible by the condition resolution system. In an entity-reference matrix, the system uses aggregation to obtain a set of options for the group of entities, along with frequency of use for each option. Processing then identifies, in one example, the top-N (for instance, topmost option) from the available options 410. For each of the options, a probability can be determined that it would be an incorrect option to use for the registered entity based on one or more identified risk factors 412. In the case of a product example, if the probability (e.g., risk score) is acceptable 414, for instance, is below a preset threshold score (meaning that the option is likely to be acceptable to the entity), then the condition resolution system proceeds to initiate an action based on the selected option to resolve the condition for the entity 418. However, in one embodiment, should the risk score be above the threshold score, or an upper threshold score where there are multiple threshold scores or levels, then the system does not proceed since no inference is possible based on the available data, and processing can proceed otherwise 416.

As noted from the example, the condition resolution system evaluates the identified one or more options to select an option (e.g., an optimum option) for resolving the condition 410, and determines a risk score for the selected option based on one or more risk factors 412. In one implementation, the risk score and the risk factors are inherent in one or more options, and the options can be chosen to minimize negative impact on the registered entity in selection of a particular option for resolution of the condition. System processing determines whether the selected option is acceptable 414, for instance, whether the risk score for the selected option is below the threshold score. If not, then the condition resolution system can, in one implementation, request a rephrasing of the condition, select another option for consideration, or perform other processing to continue to evaluate the available data to infer an acceptable option for resolution of the condition 416. Assuming that the selected option is acceptable, then the condition resolution system initiates action based on the selected option to resolve the condition for the registered entity 418. For instance, in one example, the condition resolution system initiates delivery of a product to the entity using the selected option. More generally, the system initiates any action appropriate for resolution of the condition using the selected option.

Figure 5:
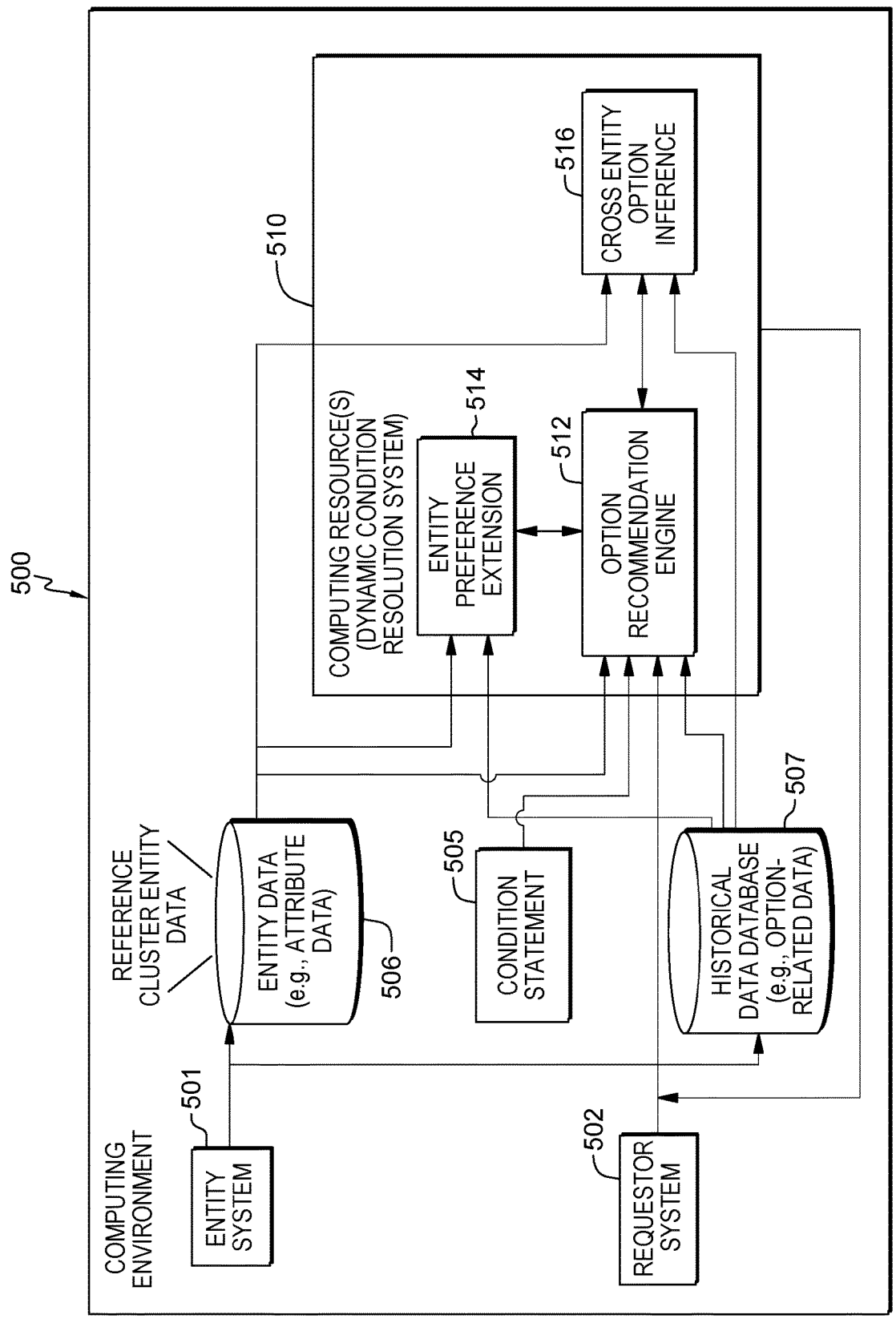
FIG. 5 depicts one embodiment of a computing environment with a dynamic condition resolution system, in accordance with one or more aspects of the present invention.

FIG. 5 depicts one embodiment of a computing environment example with a dynamic condition resolution system, in accordance with one or more aspects of the present invention. As illustrated in FIG. 5, computing environment 500 includes one or more entity systems 501, one or more requestor systems 502, and one or more computing resources 510 implementing a dynamic condition resolution system, such as described herein. Note that although shown as separate, computing resource(s) 510 implementing the dynamic condition resolution system could be associated with, or part of, requestor system 502 and/or entity system 501. Alternatively, in one or more embodiments, computing resource(s) could be cloud-implemented resources, with the dynamic condition resolution system being distributed within the computing environment, or resident, for instance, on the cloud-based computing resources.

A condition statement 505 is obtained by the dynamic condition resolution system, such as input by a requestor system 502. The condition resolution system further references, obtains, collects, etc., entity data (such as attribute data) 506 for a plurality of entities, including the entity (or registered entity) using the condition resolution system. Further, historical data is accessible to the condition resolution system via one or more databases 507. This historical data can include, in one embodiment, option-related data related to prior options used in connection with prior-encountered conditions by entities of the plurality of entities.

As illustrated in FIG. 5, in one example, the condition resolution system includes multiple program code modules including, for instance, an option recommendation engine 512, an entity preference extension module 514, and a cross-entity option inference module 516, an operational example of which is described below with reference to the process embodiment of FIG. 6.

Figure 6:
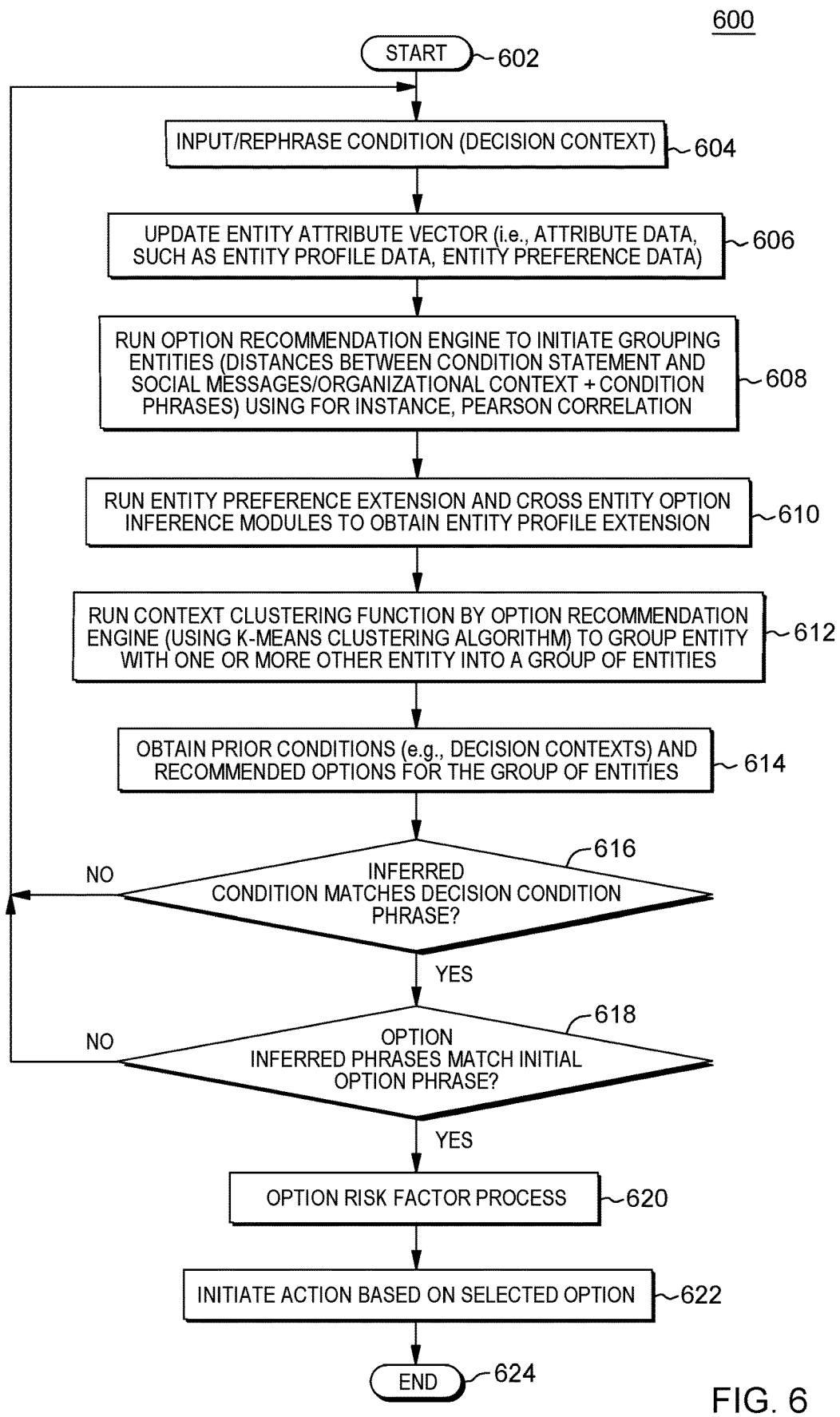
FIG. 6 depicts a further example of processing implemented by a condition resolution system, in accordance with one or more aspects of the present invention.

FIG. 6 is a further example of program code processing implemented by a condition resolution system, in accordance with one or more aspects of the present invention. As illustrated in FIG. 6, process 600 starts 602 with obtaining a condition (i.e., a decision context) to be addressed by the system 604. The condition can be obtained as a condition statement input, for instance, by a requestor or requestor system, or can be a rephrasing of a prior-evaluated condition statement. In one example, natural language processing (NLP) is utilized by the condition resolution system to parse the condition or decision context and any preferences (if stated) by the requestor or decision-seeker. For instance, assume that a requestor needs to decide if it can engage a third party delivery company to deliver a product to a registered entity. The registered entity ordered a product from the requestor company, such as a perishable food item, for delivery to the registered entity's location, and that the purchase order indicated that the registered entity would pick up the product. The time limit for the registered entity's event is approaching, and the product has not been picked up. Further, the registered entity is not reachable, nor are any other individuals specified for picking up the product. The condition (or decision context) is whether to engage a third party delivery service S2 to deliver the product to the registered entity's location. From prior history, the registered entity has agreed to have product delivered by a third party delivery service S1. Further, the entities in the registered entity's group of entities (e.g., social group, peers, or other similar entities) have used delivery service S1 and delivery service S2.

An entity-attribute vector is obtained or updated for the registered entity to include attribute data, such as entity profile data and entity-preference data 606. In one implementation, this includes determining one or more data objects for the entity based on the entity's profile data and preference data. For instance, the entity vector can be updated at some periodicity, such as weekly, to evaluate new topics and preferences that may have arisen in the business, organization and/or social networks, in which case the vector is updated. This will ensure that the computation load is simplified during the preference matching in response to a request from a decision-seeker, such as the requestor system. While dynamic creation of the entity vector based on the condition (or decision context) for a request from a decision-seeker can be accomplished, it is dependent on the quantity of information to be available, and hence periodic entity data vector updates can be beneficial.

In one embodiment, the entity data vector can be a concatenation of various features based on an entity profile, as well as entity preferences. For instance, entity profile data can include data corresponding to age group, education qualification, job experience, etc. Further, entity-preference features can be provided and/or include features that are readily available online, such as number of connections to a social network, number of online communications, social network links, etc. Additionally, artificial intelligence models can be used to infer more profile and/or preference features (such as via the entity-preference extension module 514 of the condition resolution system 510 in FIG. 5). For instance, the system can evaluate the registered entity's communications, and build a topic model (such as a Latent Dirichlet Model) to identify a set of topics of interest to the entity. Further, the system can look at online purchase history to identify categories of products or services purchased, based on an item knowledge graph. Entity ratings provided for different items (for instance, on one or more seller's websites) can be obtained by the system. In one or more implementations, numeric values are provided by the system for the entity data object. As noted, this can be accomplished using one hot encoding to obtain an entity data object, such as in the example above.

The option recommendation engine is run to facilitate grouping the entities 608, which can include running the entity-preference extension module and cross-entity option inference module to obtain any entity profile extension 610. For instance, in one implementation, the distance between the condition statement (e.g., decision context sentence and social message (OSM), context and/or organizational content+decision phrases) can be determined, and preferences to support different options or decisions can be determined by calling the entity-preference extension module and cross-entity option inference module. Each of these modules can, in one embodiment, access the current and historical preference databases to obtain entity preferences made either by the registered entity, or related preferences from the data. The entity's preferences are available in the entity-attribute vector (in one embodiment), and from the entire set of entity-vectors, the universe of preferences documented in the data is obtained, and used for the entity, along with the condition, for instance, using the topic model.

In one or more embodiments, the process further includes running a context grouping (or clustering) function by the option recommendation engine 612. For instance, in one embodiment, entities can be grouped using a K-means clustering algorithm, with the registered entity being grouped with one or more other entities in a group of entities. In one implementation, the grouping can be based on ascertained preference data for entities. This can be a standard unsupervised learning system that takes, for instance, the [social user: message] input to determine one group that the entity should be affiliated to of one or more groups.

As explained above, the data of the entities, and the preference data in the analysis, can be partitioned by grouping entities using, for instance, Minowski distance processing, or Pearson Correlation processing. The chosen similarity metric/distance is used to group similar entities (i.e., any standard clustering algorithm, such as K-means clustering, can be used).

By way of example, assume that there are five users in a group, $E\_1$, $E\_21$, $E\_65$, $E\_98$ & $E\_100$. Also, assume the system is looking at a given condition and exploring different options for resolving the condition. In one implementation, modified version of a memory-based collaborative filtering artificial intelligence algorithm (i.e., user-based, top N recommendation algorithm) can be used to identify an optimal option for use. In a product delivery context, the shop may want to infer entity preference for $E\_1$ for different options (Third Party Delivery using S2, Do Not Deliver, Third Party Delivery using S1, . . . ). Assume that the above steps of creating entity groups are done for the overall entity database held by the product shop or company, or a group of shops or companies. The shop uses a subset of entities in the database ($E\_21$, $E\_65$, $E\_98$, $E\_100$), as they belong to the same cluster as $E\_1$, and their historical preference data is available for different options. In the entity-preference matrix, the system aggregates to obtain the set of preferences by the group of entities, along with the frequency of each preference option. The system can then identify the top N preference option (e.g., top-most option preference). For each of the options in the list, a probability can be computed that it will be an incorrect option preference for registered entity $E\_1$. In the product example, \Tau_1 and \Tau_2 could be the same, and so the system evaluates whether the risk score is less than \Tau_1 to determine whether to proceed with initiating an action based on the selected option. If not, then no inference may be possible based on past data and the condition statement provided. Note that in one embodiment, \Tau_1 and \Tau_2 are class boundaries of risk acceptance for a particular option being evaluated. For instance, in one implementation, \Tau_1 is the uppermost boundary for which the class or group of accepted options are likely to be accepted without question from $E\_1$ for the selected option, whereas \Tau_2 is the upper boundary for the class or group of acceptable solutions for $E\_1$, where $E\_1$ can have some dissatisfaction with use of a particular option, whereas use of option above \Tau_2 will likely be questioned by $E\_1$.

By way of further example, individuals who accepted approved/known third party delivery, even if unspecified S1 or S2 for delivery, can be determined as follows:

| Count for Using a 3$^{rd}$ Party | Total Group Size (n) | Tau (1 − $n_m$/n) |
|---|---|---|
| Unspecified S1 = 70 | 300 | =1 − 70/300 = 1 − 0.23 = 0.77 = 77% |
| Unspecified S2 = 120 | 300 | =1 − 120/300 = 1 − 0.4 = 0.60 = 60% |

Individuals who have accepted other third party deliver based on social messages during time constraints (S2 when S1 is not available and S1 when S2 is not available), can be determined as follows:

| Count for Using a Different 3$^{rd}$ Party | Total Group Size (n) | Tau (1 − $n_m$/n) |
|---|---|---|
| Use S1 (not used before) when S2 (prior-used) is not available = 160 | 300 | =1 − 160/300 = 1 − 0.53 = 0.47 = 47% |
| Use S2 (not used before) when S1 (prior-used) is not available = 180 | 300 | =1 − 70/300 = 1 − 0.6 = 0.40 = 40% |

Continuing with the process 600 example of FIG. 6, the condition resolution system obtains conditions (such as decision contexts) and recommended options for the group of entities 614. As part of this, the option recommendation engine determines that option 1, and option 2, have the following Tau. For S1, the Tau is 0.77, while for S2, it is 0.6. S1 cannot provide delivery service for another hour, while S2 can provide the service immediately. The option recommendation engine ranks delivery service D2 (0.4) higher than D1 (0.47) in this case. Further, the use of alternate delivery services is high in the social context at issue.

Processing can compare the alternative option or recommendation statements 616 [(entities that have accepted approved/known third party delivery, even if unspecified S1 or S2), (entities that have accepted other third party delivery based on social messages during time constraints (S2 when S1 is not available and S1 when S2 is not available))] and the condition statement [should the product shop send the product to $E\_1$ location through a third party delivery service—S1 or S2?]. Using, for instance, Pearson's Correlation, etc., the matching can be found to be accurate, in which case the inferred condition matches the decision condition phrase, and goes forward 616. If not, then the original condition statement can be rephrased and the dynamic condition resolution system can proceed with processing the rephrased condition statement 604.

As illustrated in FIG. 6, processing can determine whether the inferred phrases match the initial option phrase 618, and if so, process the option risk factor 620. In one embodiment, this processing seeks to determine whether the selected option for resolving the condition for the entity has a risk score that is lower than a threshold score, such as a lower threshold score (Tau 1). If above an upper threshold score (Tau 2), then the selected option is not recommended. In the above example, it is assumed that Tau 1 and Tau 2 are the same at 0.5, and hence option S2, identified above as the selected option, can be used to initiate action 622, which completes processing 624. For instance, in one embodiment, the selected option is provided to the requestor system to be displayed on a display screen of the requestor system in order to enable the requestor to send the product with delivery service S2 to the registered entity's location.

If there is a situation where a graded risk is provided, then Tau 1 and Tau 2 could be different, in which case, the option risk factor process can include a function F1 (option_1), such as which represents positive sentiment of using an alternate third party service amongst the social group frequency $f_1=30$, versus negative sentiment frequency $f_2=10$. The decision is to use delivery service S2, since S1 is not currently available, and S2 has not been used by the registered entity before is 0.4, which falls between Tau 1 and Tau 2, in one example. Hence, there is a low risk of the entity being dissatisfied with sending of the product by delivery service S2, based on $F_1$.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node can include a computer system/server, such as the one depicted in FIG. 1. Computer system/server 102 of FIG. 1 can be practiced in distributed cloud computing environments where tasks are performed by remote processing devices that are linked through a communications network. In a distributed cloud computing environment, program modules may be located in both local and remote computer system storage media including memory storage devices. Computer system/server 102 is capable of being implemented and/or performing any of the functionality set forth hereinabove.

Figure 7:
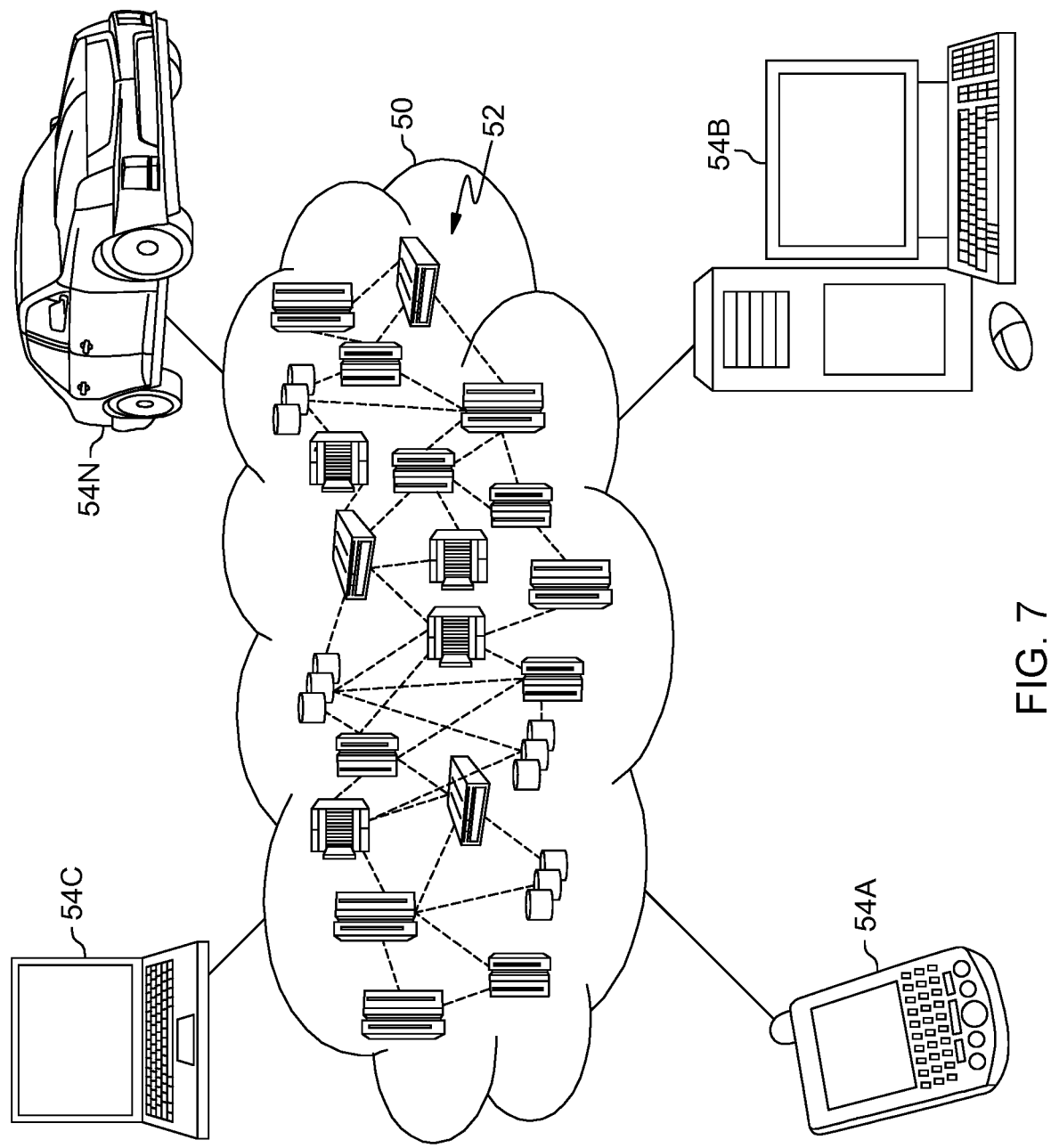
FIG. 7 depicts one embodiment of a computing environment which can facilitate implementing, or be used in association with, certain aspects of an embodiment of the present invention.

Referring now to FIG. 7, illustrative cloud computing environment 50 is depicted. As shown, cloud computing environment 50 can comprise one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
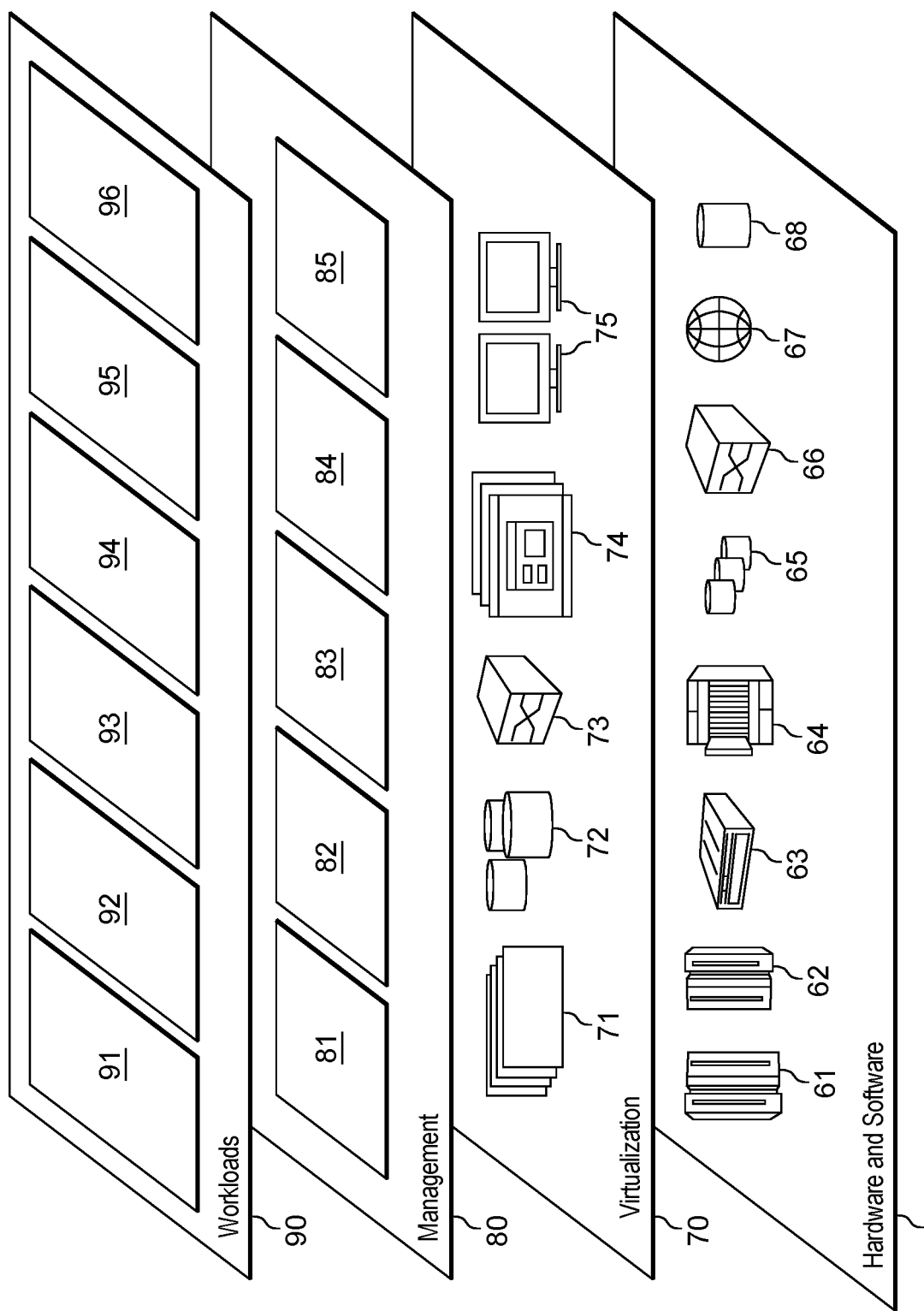
FIG. 8 depicts abstraction model layers according to an embodiment of the present invention.

Referring to FIG. 8, a set of functional abstraction layers provided by cloud computing environment 50 (FIG. 7) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and condition resolution system processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer-implemented method of facilitating resolving conditions, the computer-implemented method comprising:
    registering an entity with a condition resolution system of a computing environment to facilitate the condition resolution system resolving one or more conditions on behalf of the registered entity in the absence of the registered entity resolving the one or more conditions, the one or more conditions being one or more future-occurring conditions, where the registered entity is unavailable to select an option to resolve the condition in a timely manner at time of occurrence of the condition, and where the registered entity has not preselected an option for resolving the condition;
    obtaining, by the condition resolution system, an indication of existence of a condition of the one or more conditions to be resolved on behalf of the registered entity in the absence of the registered entity having resolved the condition;
    using a trained machine learning model to group, by the condition resolution system, the registered entity with one or more other entities into a group of entities;
    using a memory-based collaborative filtering artificial intelligence algorithm to ascertain, by the condition resolution system, one or more options for resolving the condition, the ascertaining using the condition to be resolved and option-related data associated with entities of the group of entities in ascertaining the one or more options for resolving the condition;
    evaluating, by the condition resolution system, the one or more options to select an option for resolving the condition on behalf of the registered entity;
    determining, by the condition resolution system, a risk score for the selected option for resolving the condition on behalf of the registered entity, the risk score being based on one or more risk factors;
    determining, by the condition resolution system, that the risk score is acceptable by ascertaining that the risk score is lower than a threshold score, wherein the threshold score is preselected to minimize risk of negative impact on the registered entity, and thereby minimize registered entity dissatisfaction, in resolving the condition on behalf of the registered entity in absence of the registered entity assisting with resolution of the condition due to the registered entity being unavailable to select an option to resolve the condition in a timely manner, and where the registered entity has not preselected an option for resolving the condition; and
    based on determining that the risk score is acceptable, initiating an action, by the condition resolution system, to facilitate resolving based on the selected option the condition for the registered entity in the absence of the registered entity assisting with resolution of the condition.

2. The computer-implemented method of claim 1, wherein the condition resolution system further collects attribute data related, at least in part, to the registered entity to facilitate resolution of the condition in the absence of the registered entity resolving the condition.

3. The computer-implemented method of claim 1, further comprising obtaining, by the condition resolution system, attribute data for the registered entity, and creating an entity data object using the attribute data for the registered entity, the grouping comprising using the entity data object in grouping the registered entity with the one or more other entities into the group of entities.

4. The computer-implemented method of claim 1, further comprising obtaining, by the condition resolution system, attribute data for the registered entity, and wherein the attribute data for the registered entity includes profile data of the registered entity and preference data of the registered entity, the grouping using, at least in part, the attribute data for the registered entity in grouping the registered entity with the one or more other entities in the group of entities.

5. The computer-implemented method of claim 1, wherein grouping the registered entity with the one or more other entities includes generating a topic model to identify one or more topics of interest to the registered entity, and using the one or more topics of interest to the registered entity in grouping the registered entity with the one or more other entities.

6. The computer-implemented method of claim 5, wherein the one or more topics includes ratings data provided by the registered entity for one or more items, and wherein grouping the registered entity with the one or more entities includes using the ratings data in grouping the registered entity with the one or more other entities in the group of entities.

7. The computer-implemented method of claim 1, wherein the grouping is based on a standard clustering metric.

8. The computer-implemented method of claim 1, wherein the evaluating further comprises evaluating via machine learning the one or more options to select an optimum option for resolving the condition.

9. A system comprising:
    a memory;
    one or more processors communicatively coupled with the memory; and
    program code executable by the one or more processors via the memory to perform a method comprising:

registering an entity with a condition resolution system of a computing environment to facilitate the condition resolution system resolving one or more conditions on behalf of the registered entity in the absence of the registered entity resolving the one or more conditions, the one or more conditions being one or more future-occurring conditions, where the registered entity is unavailable to select an option to resolve the condition in a timely manner at time of occurrence of the condition, and where the registered entity has not preselected an option for resolving the condition;

obtaining, by the condition resolution system, an indication of existence of a condition of the one or more conditions to be resolved on behalf of the registered entity;

using a trained machine learning model to group, by the condition resolution system, the entity with one or more other entities into a group of entities;

using a memory-based collaborative filtering artificial intelligence algorithm to ascertain, by the condition resolution system, one or more options for resolving the condition, the ascertaining using the condition to be resolved and option-related data associated with entities of the group of entities in ascertaining the one or more options for resolving the condition;

evaluating, by the condition resolution system, the one or more options to select an option for resolving the condition on behalf of the registered entity;

determining, by the condition resolution system, a risk score for the selected option for resolving the condition on behalf of the registered entity, the risk score being based on one or more risk factors;

determining, by the condition resolution system, that the risk score is acceptable by ascertaining that the risk score is lower than a threshold score, wherein the threshold score is preselected to minimize risk of negative impact on the registered entity, and thereby minimize registered entity dissatisfaction, in resolving the condition on behalf of the registered entity in absence of the registered entity assisting with resolution of the condition due to the registered entity being unavailable to select an option to resolve the condition in a timely manner, and where the registered entity has not preselected an option for resolving the condition; and based on determining that the risk score is acceptable, initiating an action, by the condition resolution system, to facilitate resolving based on the selected option the condition for the registered entity in the absence of the registered entity assisting with resolution of the condition.

10. The system of claim 9, wherein the method further comprises obtaining, by the condition resolution system, attribute data for the registered entity, and creating an entity data object using the attribute data for the registered entity, the grouping comprising using the entity data object in grouping the registered entity with the one or more other entities into the group of entities.

11. The system of claim 9, wherein the method further comprises obtaining, by the condition resolution system, attribute data for the registered entity, and wherein the attribute data for the registered entity includes profile data of the registered entity and preference data of the registered entity, the grouping using, at least in part, the attribute data for the registered entity in grouping the registered entity with the one or more other entities in the group of entities.

12. The system of claim 9, wherein grouping the registered entity with the one or more other entities includes generating a topic model to identify one or more topics of interest to the registered entity, and using the one or more topics of interest to the registered entity in grouping the registered entity with the one or more other entities.

13. The system of claim 12, wherein the one or more topics include ratings data provided by the registered entity for one or more items, and wherein grouping the registered entity with the one or more entities includes using the ratings data in grouping the registered entity with the one or more other entities in the group of entities.

14. The system of claim 9, wherein the grouping is based on a standard clustering metric.

15. A computer program product comprising:
a computer-readable storage medium having computer-readable code embodied therewith, the computer-readable code being executable by one or more processors to cause the one or more processors to:

register an entity with a condition resolution system of a computing environment to facilitate the condition resolution system resolving one or more conditions on behalf of the registered entity in the absence of the registered entity resolving the one or more conditions, the one or more conditions being one or more future-occurring conditions, where the registered entity is unavailable to select an option to resolve the condition in a timely manner at time of occurrence of the condition, and where the registered entity has not preselected an option for resolving the condition;

obtain, by the condition resolution system, an indication of existence of a condition of the one or more conditions to be resolved on behalf of the registered entity in the absence of the registered entity resolving the condition;

using a trained machine learning model to group, by the condition resolution system, the entity with one or more other entities into a group of entities;

using a memory-based collaborative filtering artificial intelligence algorithm to ascertain, by the condition resolution system, one or more options for resolving the condition, the ascertaining using the condition to be resolved and option-related data associated with entities of the group of entities in ascertaining the one or more options for resolving the condition;

evaluate, by the condition resolution system, the one or more options to select an option for resolving the condition on behalf of the registered entity;

determine, by the condition resolution system, a risk score for the selected option for resolving the condition on behalf of the registered entity, the risk score being based on one or more risk factors;

determining, by the condition resolution system, that the risk score is acceptable by ascertaining that the risk score is lower than a threshold score, wherein the threshold score is preselected to minimize risk of negative impact on the registered entity, and thereby minimize registered entity dissatisfaction, in resolving the condition on behalf of the registered entity in absence of the registered entity assisting with resolution of the condition due to the registered entity being unavailable to select an option to resolve the condition in a timely manner, and where the registered entity has not preselected an option for resolving the condition; and based on determining that the risk score is being acceptable, initiating an action, by the condition resolution system, to facilitate resolving based on the selected option the condition for the registered entity in the absence of the registered entity assisting with resolution of the condition.

16. The computer program product of claim 15, wherein the computer-readable code is executable by the one or more processors to cause the one or more processors to obtain, by the condition resolution system, attribute data for the registered entity, and create an entity data object using the attribute data for the registered entity, wherein the grouping includes using the entity data object in grouping the registered entity with the one or more other entities into the group of entities.

17. The computer program produce of claim 15, wherein the computer-readable code is executable by the one or more processors to cause the one or more processors to obtain, by the condition resolution system, attribute data for the entity, and wherein the attribute data for the registered entity includes profile data of the registered entity and preference data of the registered entity, and the grouping uses, at least in part, the attribute data for the registered entity in grouping the registered entity with the one or more other entities in the group of entities.

18. The computer program product of claim 15, wherein grouping the registered entity with the one or more other entities includes generating a topic model to identify one or more topics of interest to the registered entity, and using the one or more topics of interest to the entity in grouping the registered entity with the one or more other entities.

* * * * *